May 31, 1949.　　　M. S. BAKER　　　2,471,668
TRANSMISSION

Filed Aug. 30, 1946　　　　　　　　　　2 Sheets-Sheet 1

INVENTOR.
MALVERN S. BAKER
BY Hauke & Hardesty
ATTORNEYS

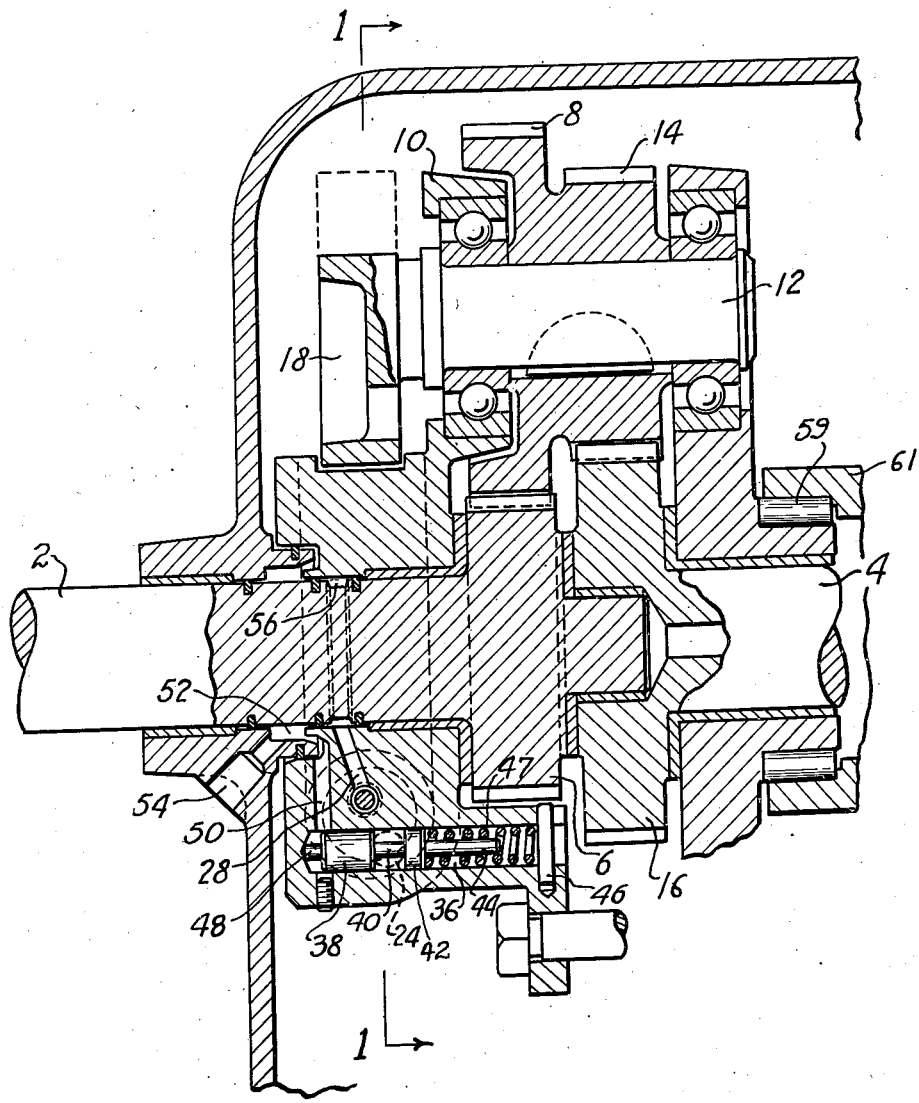

Patented May 31, 1949

2,471,668

UNITED STATES PATENT OFFICE 2,471,668

TRANSMISSION

Malvern S. Baker, Muskegon, Mich., assignor to Continental Motors Corporation, Detroit, Mich., a corporation of Virginia Application August 30, 1946, Serial No. 693,938

4 Claims. (Cl. 74—774)

This invention relates to power transmitting apparatus, especially to motor vehicle transmissions.

It is an object of this invention to provide a transmission in which the gear reduction can be varied from a maximum to direct drive without interrupting the continuity of the drive. This is accomplished in a planetary type of transmission provided with hydraulic resistance to rotation of the planet gears about the sun gear.

In the drawings:

Fig. 2 is a view in section substantially on line 2—2 of Figure 1.

Figure 1:
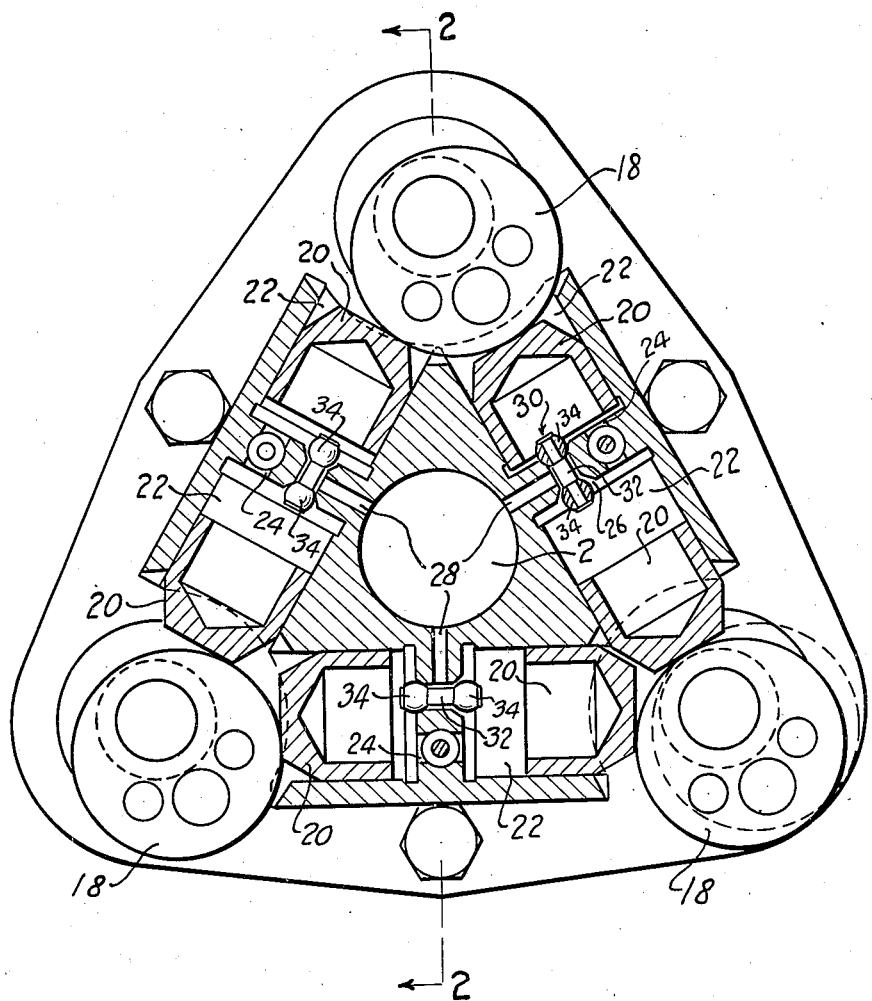
Fig. 1 is a view in section substantially on line 1—1 of Figure 2.

Shaft 2 provides the input power connection for this transmission and shaft 4 furnishes the output power connection. A power train having a variable ratio of input speed to output speed is provided in the form of a planetary transmission. Sun gear 6 is integral with shaft 2 for rotation thereby. Planet gear 8 meshes with sun gear 6 and is mounted for rotation about the sun gear in planet carrier 10 on shaft 12. Planet gear 14 is integral with planet gear 8 and meshes with sun gear 16 which drives output shaft 4.

Shaft 12 carries a cam 18 which is mounted to reciprocate piston 20 in cylinder 22. As is best seen in Figure 1, two substantially identical pistons 20 are mounted in opposed cylinders 22. Each pair of opposed cylinders is provided with fluid communication passages 24 and 26. Fluid under pressure is admitted into the passage 26 through a passage 28. A check valve 30 is provided in each passage 26. Check valve 30 comprises simply a pin 32 with a ball-shaped closure member 34 at each end.

Passage 24 between the cylinders intersects a bore 36. A piston valve 38 is mounted for reciprocation in bore 36. Piston valve 38 carries a valve stem 40 on which is mounted a guide collar 42. Collar 42 carries a stem 44 which serves as a stop for valve 38 by abutting against stop pin 46. Spring 47 is disposed between stop 46 and collar 42 to bias valve 38 toward its extreme left position. A stem 48 at the left end of piston 38 serves to limit the travel to the left of piston 38. Pressure fluid is admitted into bore 36 through passage 50. Passage 50 receives fluid from annular chamber 52, which is supplied with fluid through the passage 54.

Fluid to operate valve 38 may be oil taken from the lubrication supply source and can be controlled by a torque reaction valve, a governor controlled magnetic valve, or a manually operated valve.

Fluid supplied to cylinders 22 may also be oil taken from the lubrication supply source, admitted into cylinders 22 through passages 26 and 28, and the annular chamber 56 provided in shaft 2.

Planet carrier 10 is held against reverse rotation by a one way brake such as shown at 59, operating against the member 61 forming part of the housing.

Operation

As power is supplied to shaft 2, sun gear 6 rotates. With a high torque requirement on shaft 4 planet gears 8 and 14 will rotate about their respective sun gears 6 and 16. It should be noted here that the expression "planet gear rotates about its sun gear" is intended to mean actual rotation of the planet gear on the periphery of its sun gear, and does not include operation of the transmission in direct drive. In other words, rotation of a planet gear about its sun gear as used herein means rotation of a planet gear about its own axis, in this case, the axis of shaft 12.

Inasmuch as gears 8 and 14 are keyed to shaft 12, rotation of these planet gears about their common axis causes rotation of the eccentric cams 18. As cams 18 rotate inward they reciprocate pistons 20 inwardl. The pistons 20 are paired so that as one piston 20 moves inward its opposing piston moves outward maintaining a substantially constant fluid volume between the two pistons. In order to supply make-up fluid which is lost by leakage, fluid under pressure is constantly supplied through check valves 30 thus insuring that each piston 20 will follow its cam 18 as the cam 18 rotates outward. Fluid passes from one cylinder 20 to its opposed cylinder by way of passage 24. The higher the speed of rotation of cams 18, the greater will be the resistance to the passage of fluid between opposed cylinders. This resistance to the passage of fluid between cylinders tends to reduce the ratio of input speed to output speed, or the ratio of speed of rotation of shaft 2 to the speed of rotation of shaft 4. This resistance to fluid passage can be regulated by adjusting the position of piston valve 38 in its bore 36 to vary the effective opening of fluid passage 24. The position of piston valve 38 can be controlled by admitting fluid under pressure to its left side, as seen in Figure 2, through passages 50, 52, and 54. If piston valve 38 is moved far enough to the right to completely close off passage 24, the planet gears will no longer rotate about their own axes about the sun gears, and the unit will rotate as a whole to provide direct drive from shaft 2 to shaft 4.

It should be noted that the resistance to the passage of fluid through the passages 24 does not entail a loss since the force which holds back on the eccentric cams tends to rotate the carrier and planet gears in the same direction as that of the two shafts 2 and 4.

Since oil pressure is built up in a cylinder under compression, the check valve 30 closes on the compression side, permitting oil to be admitted under lubrication pressure to the opposite cylinder keeping the piston of that cylinder against its eccentric cam and filling the cylinder so that it will be ready for compression on the return stroke of its piston.

Shock due to engagement can be entirely eliminated because the speed of control valve 38, shutting off the fluid passage 24, can be regulated for gradual or immediate cut-off.

I claim:

1. In a planetary transmission, an input shaft and an output shaft, a sun gear mounted on each shaft, a planet gear carrier supported for rotation in one direction about the axes of said shafts, spindles rotatably supported by said carrier, planet gears meshing with said sun gears and secured to said spindles, a cam secured to each of said spindles, said carrier structure provided with opposed cylinders disposed intermediate a pair of adjacent cams, pistons operable in each of said cylinders, means supplying fluid under pressure to said cylinders to urge said pistons into engagement with said cams but only supplying fluid to one cylinder at a time, said planet gears operable to rotate about their own axes and to drivingly rotate said cams relative to said carrier when the ratio of input speed to output speed is other than unity, a passage communicating the opposed cylinders with each other, and adjustable valve means in said passage and operable to variably restrict flow of fluid through said passage from one cylinder to the other to vary the ratio of input speed to output speed of said shafts.

2. In a planetary transmission, an input shaft and an output shaft, a sun gear mounted on each shaft, a planet gear carrier supported for rotation in one direction about the axes of said shafts, spindles rotatably supported by said carrier, planet gears meshing with said sun gears and secured to said spindles, a cam secured to each of said spindles, said carrier structure provided with opposed axially aligned cylinders disposed intermediate a pair of adjacent cams, pistons operable in each of said cylinders, means supplying fluid under pressure to said cylinders to urge said pistons outwardly of said opposed cylinders into engagement with said cams but supplying fluid to only one cylinder at a time, said planet gears operable to rotate about their own axes and to drivingly rotate said cams relative to said carrier when the ratio of input speed to output speed is other than unity, a passage communicating the opposed cylinders with each other, and adjustable valve means in said passage and operable to variably restrict flow of fluid through said passage from one cylinder to the other to vary the ratio of input speed to output speed of said shafts.

3. In a planetary transmission, an input shaft and an output shaft, a sun gear mounted on each shaft, a planet gear carrier supported for rotation in one direction about the axes of said shafts, spindles rotatably supported by said carrier, planet gears meshing with said sun gears and secured to said spindles, a cam secured to each of said spindles, said carrier structure provided with opposed axially aligned cylinders disposed intermediate a pair of adjacent cams, pistons operable in each of said cylinders, means supplying fluid under pressure to said cylinders to urge said pistons outwardly of said opposed cylinders into engagement with said cams but supplying fluid to only one cylinder at a time, said planet gears operable to rotate about their own axes and to drivingly rotate said cams relative to said carrier when the ratio of input speed to output speed is other than unity, a passage communicating the opposed cylinders with each other, and adjustable valve means in said passage and operable to variably restrict flow of fluid through said passage from one cylinder to the other to vary the ratio of input speed to output speed of said shafts, one of said adjacent cams constructed and arranged to move the piston coacting therewith inwardly of the cylinder, while said adjacent cam coacting with the piston operable in the other associated cylinder allows for movement of said last mentioned piston outwardly of the cylinder at the same speed as the first piston.

4. In a planetary transmission, an input shaft and an output shaft, a sun gear mounted on each shaft, a planet gear carrier supported for rotation in one direction about the axes of said shafts, spindles rotatably supported by said carrier, planet gears meshing with said sun gears and secured to said spindles, a cam secured to each of said spindles, said carrier structure provided with opposed axially aligned cylinders disposed intermediate a pair of adjacent cams, pistons operable in each of said cylinders, means for supplying fluid under pressure to said cylinders to urge said pistons outwardly of said opposed cylinders into engagement with said cams but supplying fluid to only one cylinder at a time, said planet gears operable to rotate about their own axes and to drivingly rotate said cams relative to said carrier when the ratio of input speed to output speed is other than unity, a passage communicating the opposed cylinders with each other, and adjustable valve means in said passage and operable to variably restrict flow of fluid through said passage from one cylinder to the other to vary the ratio of input speed to output speed of said shafts, one of said adjacent cams constructed and arranged to move the piston coacting therewith inwardly of the cylinder, while said adjacent cam coacting with the piston operable in the other associated cylinder allows for movement of said last mentioned piston outwardly of the cylinder at the same speed as the first piston, said cylinders arranged generally triangularly and symmetrically about the axes of said input and output shafts, each of said cams being rotatable about axes extending normal to the plane containing all said cylinder axes, the center of rotation of said cams disposed at the apices of the triangle formed by the axes of said cylinders.

MALVERN S. BAKER.

REFERENCES CITED

The following references are of record in the file of this patent:

UNITED STATES PATENTS

| Number | Name | Date |
|---|---|---|
| 1,105,792 | Jessen | Aug. 4, 1914 |
| 1,880,748 | Bower | Oct. 4, 1932 |
| 1,938,111 | Nibler | Dec. 5, 1933 |
| 2,153,796 | Fletcher | Apr. 11, 1939 |

FOREIGN PATENTS

| Number | Country | Date |
|---|---|---|
| 56,639 | Great Britain | Mar. 16, 1922 |
| 338,326 | Italy | Mar. 11, 1936 |
| 403,930 | Great Britain | Mar. 30, 1932 |